Lewis J. Atwood.
Tool for sizing Lamp chimneys

PATENTED
DEC 10 1867

N°71838

Witnesses.
Cha² H Smith
Geo. D. Walker

Lewis J. Atwood
per L. W. Serrell
Atty.

UNITED STATES PATENT OFFICE.

LEWIS J. ATWOOD, OF WATERBURY, CONNECTICUT, ASSIGNOR TO HIMSELF AND HOLMES, BOOTH & HAYDENS, OF SAME PLACE.

IMPROVED TOOL FOR SIZING LAMP-CHIMNEYS.

Specification forming part of Letters Patent No. 71,838, dated December 10, 1867.

*To all whom it may concern:*

Be it known that I, LEWIS J. ATWOOD, of Waterbury, in the county of New Haven and State of Connecticut, have invented, made, and applied to use a certain new and useful Improvement in Tools for Sizing and Forming Lamp-Chimneys, &c.; and I do hereby declare the following to be a full, clear, and exact description of the said invention, reference being had to the annexed drawing, making part of this specification, wherein—

Figure 2:
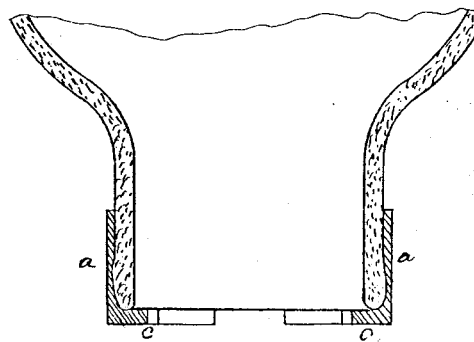
Figure 1:
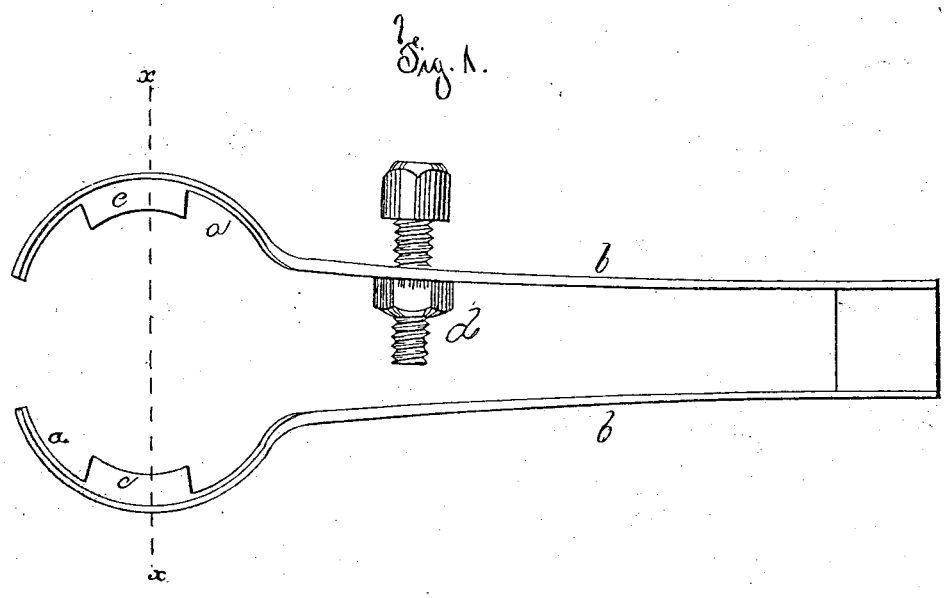

Figure 1 is a side view of said tool, and Fig. 2 is a cross-section of the same at the line $x\ x$ as applied to the base of a lamp-chimney.

The same letters indicate corresponding parts.

Heretofore, in the manufacture of glass lamp-chimneys, it has been usual for the workman to depend upon his eye in turning out the flange at the base of the chimney and in sizing and forming the cylindrical part of the chimneys for lamp-burners, or else a burner has been employed as a standard to test whether the chimney was the right size or not. This mode of manufacture caused the chimneys to be unreliable and varying in size to such an extent that the cylindrical or slip chimney is but little used, because of the difficulty of manufacturing it of a perfectly accurate size and shape, so as to hold in the burner by the friction upon its sides at the base.

The nature of my said invention consists in a pair of adjustable sizing and shaping jaws fitted so as to be closed by hand around the base of the glass chimney while the same is in a heated state and is revolved by the glass-blower in the usual manner. Thereby the chimney is accurately shaped to fit the burner, and no additional cost is involved in so doing.

In the drawing, $a\ a$ are jaws mounted upon the springs $b$, forming the handle, and $d$ is an adjusting-screw that regulates the point to which the tool can be closed. The jaws $a$ are curved or formed to correspond with the shape of the exterior of the base of the chimney or similar article, and $c\ c$ are flanges inside the jaws, which cause the tool to stop against the bottom end of the chimney, and thereby insure the uniform size and shape of the chimney-base or similar article, the said tool being applied to the glass while sufficiently hot to be molded thereby while the workman revolves his blow-pipe and chimney.

The size and shape of and number of parts composing the forming or shaping tools will have to vary according to the article to be formed. I therefore do not limit myself in this particular, so long as the tools are fitted to be closed to a definite but adjustable point.

What I claim, and desire to secure by Letters Patent, is—

The adjustable sizing and shaping jaws employed, substantially as specified, in the manufacture of glass lamp-chimneys and similar articles.

In witness whereof I have hereunto set my signature this 25th day of October, A. D. 1867.

L. J. ATWOOD.

Witnesses:
JAS. MCABBOTT,
JOSIAH M. WHINNIE.